(12) United States Patent
Young et al.

(10) Patent No.: US 8,699,250 B2
(45) Date of Patent: Apr. 15, 2014

(54) POWER CONVERTER

(75) Inventors: George Young, Blackrock (IE); Garry Tomlins, Glaunthaune (IE); Michael John Barry, Bandon (IE); Jacobus Marthinus Barnard, Dunshaughlin (IE)

(73) Assignee: Commergy Technologies Limited, Dublin (IE)

( * ) Notice: Subject to any disclaimer, the term of this patent is extended or adjusted under 35 U.S.C. 154(b) by 983 days.

(21) Appl. No.: 12/089,746

(22) PCT Filed: Oct. 10, 2006

(86) PCT No.: PCT/EP2006/067245
§ 371 (c)(1),
(2), (4) Date: Oct. 27, 2008

(87) PCT Pub. No.: WO2007/042517
PCT Pub. Date: Apr. 19, 2007

(65) Prior Publication Data
US 2009/0129130 A1 May 21, 2009

(30) Foreign Application Priority Data

Oct. 10, 2005 (IE) .................................. S2005/0683
Mar. 10, 2006 (IE) ..................................... 2006/0190

(51) Int. Cl.
*H02J 1/10* (2006.01)
*G05F 1/00* (2006.01)

(52) U.S. Cl.
USPC ............................................. 363/65; 323/266

(58) Field of Classification Search
USPC ............. 323/65–72, 234, 237, 265–266, 268, 323/270, 273, 282; 363/65–72
See application file for complete search history.

(56) References Cited

U.S. PATENT DOCUMENTS

| | | | | |
|---|---|---|---|---|
| 3,989,916 A | * | 11/1976 | Amagami et al. | 219/622 |
| 5,483,148 A | * | 1/1996 | Torrey | 323/205 |
| 5,532,635 A | * | 7/1996 | Watrous et al. | 327/310 |
| 5,801,521 A | * | 9/1998 | Mizoguchi et al. | 323/282 |

(Continued)

OTHER PUBLICATIONS

"Power Factor Preregulators Based on Combined Buck-Flyback Topologies," IEEE Transactions on Power Electronics, vol. 15, No. 2, Mar. 2000, pp. 197-204 (Spiazzi, et al.).

(Continued)

*Primary Examiner* — Adolf Berhane
*Assistant Examiner* — Jeffrey Gblende
(74) *Attorney, Agent, or Firm* — William B. Kempler; Wade J. Brady, III; Frederick J. Telecky, Jr.

(57) ABSTRACT

This invention relates to a power converter (1) comprising a converter input (3), a converter output (5), a power factor correction (PFC) stage (7) and an isolation stage (9). The PFC stage (7) is implemented by way of a buck PFC with low side drive and low side current sensing, There is provided a third stage, an intermediate buck pre-regulation stage (11), intermediate the buck PFC stage (7) and the isolation stage (9), Control of the power converter output voltage is achieved by varying the duty cycle of the intermediate buck pre-regulation stage (11) and therefore the isolation stage (9) may be an unregulated stage operated as a fixed DCDC voltage converter. The isolation stage (9) is operated as a 50%-50% duty cycle double ended stage. The configuration of power converter allows for a relatively inexpensive, highly efficient converter with 90%+ efficiency and simplified control.

40 Claims, 6 Drawing Sheets

(56) References Cited

U.S. PATENT DOCUMENTS

| | | | |
|---|---|---|---|
| 5,844,399 A * | 12/1998 | Stuart | 323/282 |
| 5,882,492 A * | 3/1999 | Manley et al. | 204/298.08 |
| 6,177,645 B1 * | 1/2001 | Church et al. | 219/121.39 |
| 6,272,026 B1 * | 8/2001 | Goder et al. | 363/25 |
| 6,441,597 B1 * | 8/2002 | Lethellier | 323/282 |
| 6,728,118 B1 | 4/2004 | Chen et al. | |
| 6,784,649 B1 * | 8/2004 | Ohms | 323/284 |
| 6,973,077 B1 * | 12/2005 | Olsson et al. | 370/359 |
| 7,116,014 B1 * | 10/2006 | Herbert | 307/69 |
| 7,352,161 B2 * | 4/2008 | Tiew et al. | 323/285 |
| 7,408,141 B2 * | 8/2008 | Chato et al. | 250/214 A |
| 2002/0064060 A1 * | 5/2002 | Huang | 363/17 |
| 2002/0159212 A1 * | 10/2002 | Oughton, Jr. | 361/111 |
| 2004/0044371 A1 * | 3/2004 | Tamura et al. | 607/5 |
| 2004/0227497 A1 * | 11/2004 | Asanuma et al. | 323/283 |
| 2005/0030772 A1 * | 2/2005 | Phadke | 363/71 |
| 2005/0134247 A1 * | 6/2005 | Lipcsei et al. | 323/284 |
| 2005/0195622 A1 * | 9/2005 | Lehman et al. | 363/17 |
| 2005/0243579 A1 * | 11/2005 | Jang et al. | 363/16 |
| 2005/0280163 A1 * | 12/2005 | Schaffer et al. | 257/778 |
| 2006/0176038 A1 * | 8/2006 | Flatness et al. | 323/282 |
| 2006/0243716 A1 * | 11/2006 | Stava et al. | 219/130.5 |
| 2007/0052403 A1 * | 3/2007 | Stoichita | 323/316 |
| 2007/0138971 A1 * | 6/2007 | Chen | 315/209 R |

OTHER PUBLICATIONS

"A New Driving Scheme for Synchronous Rectifiers: Single Winding Self-Driven Synchronous Rectification," IEEE Transactions on Power Electronics, vol. 16, No. 6, Nov. 2001, pp. 803-811 (Alou, et al.).

* cited by examiner

POWER CONVERTER

RELATED APPLICATIONS

The subject application is a U.S. National Stage application that claims the priority of International Application No. PCT/EP2006/067245, filed on 10 Oct. 2006, which claims the priority of Irish National Application Nos.: S2005/0683, filed on 10 Oct. 2005 and 2006/0190, filed on 10 Mar. 2006.

This invention relates to a power converter. More particularly, this invention relates to an AC/DC converter.

Power converters and in particular AC/DC power converters are used in a wide range of applications. Generally speaking, these power converters are used to transform the incoming AC mains supply line voltage to one or more DC voltages suitable for use with the equipment that the power converter is charged with supplying voltage to. In many cases, the power converter will transform the AC mains line voltage into several DC line voltages such as in the case of electronic equipment. When designing a power converter, there are essentially two main considerations taken into account, namely cost and efficiency. Usually, there is a cost/efficiency tradeoff in most applications of power converter design.

Certain applications, such as personal computer power supplies, server power supplies and telecommunications equipment power supplies, typically require highly efficient power supplies so that the relatively sensitive equipment contained therein may operate to a sufficient standard. Heretofore, this has often resulted in the power supply for these types of equipment being relatively expensive to construct. One common approach used in the construction of power supplies for such equipment entails providing a boost pre-regulator followed by a phase-shitted full-bridge approach. There are however problems with such an approach as it tends to be relatively expensive to implement while still not being highly efficient i.e. in the range of 90%+ efficiency.

It is an object therefore of the present invention to provide a power converter that is relatively inexpensive to construct while at the same time being highly efficient in use. It is a further object of the present invention to provide a power converter that is relatively simple to construct and manufacture.

STATEMENTS OF INVENTION

According to the invention there is provided a power converter comprising a converter input, a converter output, a power factor correction (PFC) stage and an isolation stage, characterised in that the PFC stage further comprises a buck PFC stage, the isolation stage comprises an unregulated self driven stage and the power converter further comprises a pre-regulation stage, the pro-regulation stage comprising an intermediate buck stage which follows the buck PFC stage.

By having such a power converter, it is no longer necessary to use a boost pre-regulator followed by a phase-shifted full-bridge approach or other similar approach. The power converter implements a three-stage approach with a pair of buck converters, one followed by the other and an isolation stage following the second buck stage. This is seen as a particularly simple configuration of power converter that will be relatively inexpensive to construct, while at the same time providing a highly efficient power converter with 90%+ efficiency. Such a power converter is capable of complying with International Standards for Harmonic Current Compliance over a wide range of input powers depending on the conduction angle and wave shape employed. Due to the fact that a buck PFC stage is used, bulk capacitor voltage must be less than typically 90 volts (V) to ensure adequate conduction angle at low line voltages. Therefore, the intermediate buck pre-regulation stage can operate at voltage levels where Schottky diodes can be used. These Schottky diodes have virtually zero reverse recovery charge and therefore increased operating frequency of the intermediate buck stage is possible. This helps to increase the efficiency of the converter.

Furthermore, as the intermediate buck converter is operating using a quasi-fixed input voltage, typically in the range of 60V to 90V, with a relatively small double line frequency component, the efficiency of the second buck stage will be very high. Furthermore, the range between the nominal bulk capacitor voltage and the voltage level going into the isolation stage is typically chosen to permit sufficient hold-up time and to handle transient conditions in the bulk capacitor. By using the intermediate buck stage before the isolation stage, it is possible to manage conditions where reverse power How may occur as may be the case when using synchronous rectifiers. Finally, and very importantly, the isolation stage can be designed for optimum efficiency. The isolation stage may function approximately as a fixed ratio DC voltage transformer and therefore can be easily designed for zero-voltage switching to allow easy deployment of self-driven synchronous rectifier approaches in the converter outputs. All of these provide for a relatively inexpensive power converter that is highly efficient, In one embodiment, of the invention there is provided a power converter in which the buck PFC stage is implemented using low side drive. By operating the buck PFC stage with a low side drive, the drive is particularly simple and also allows for relatively simple peak current sensing which is valuable in containing inrush currents, Furthermore, this approach reduces stress on input rectification and filter components and enhances immunity of the power converter to circuit transients.

In another embodiment of the invention there is provided a power converter in which the intermediate buck stage is implemented using low side drive, with the drive taken from the voltage of the low side of a bulk capacitor, $V_{intermediate}$. In this way, the intermediate buck stage may also be provided with low side drive and low side current sensing, The isolation stage can therefore be deployed with the high side of the isolation stage referenced to the high side rail. This particular configuration will allow simple control of the intermediate buck stage.

In a further embodiment of the invention there as provided a power converter in which the isolation stage further comprises a 50%-50% duty cycle double ended stage. Preferably, the isolation stage may be implemented using self driven synchronous rectifiers. By having a 50%-50% duly cycle double ended stage, the isolation stage functions approximately as a fixed ratio DC voltage transformer. The isolation stage can be designed for zero voltage switching and allows for easy deployment of self-driven synchronous rectifier approaches.

In one embodiment of the invention there is provided a power converter in which the power converter further comprises an input filter stage and an input rectification stage. Preferably, the input rectification stage is provided by way of a full bridge rectifier.

In another embodiment of the invention there is provided a power converter in which the buck PFC stage comprises a bulk capacitor, the bulk capacitor being referenced to the high side rail. This is seen as a relatively convenient configuration of power converter buck PFC stage which will allow the drive circuitry to be referenced to the low side rail thereby enhancing control of the buck PFC stage.

In another embodiment of the invention there is provided a power converter in which there is provided means to sense the bulk capacitor voltage in a differential fashion. It is envisaged that the means to sense the bulk capacitor voltage in a differential fashion comprises a differential amplifier. Alternatively, the means to sense the bulk capacitor voltage in a differential fashion may comprise a PNP transistor operating as a low cost current source. In another alternative, the means to sense the bulk capacitor voltage in a differential fashion may comprise an optocoupler. Each of these means for sensing the bulk capacitor voltage in a differential fashion are seen as effective and useful and the final choice will depend on the cost and resolution requirements of the overall power converter.

In one embodiment of the invention there is provided a power converter in which the bulk capacitor voltage is sensed in a linear fashion. Alternatively, the bulk capacitor vollage may be sensed in a non-linear fashion.

In another embodiment of the invention there is provided a power converter in which the buck PFC comprises a buck switch and the control algorithm used for the buck switch is a clamped current approach. Alternatively, the buck PFC comprises a buck switch and the control algorithm used for the buck switch is a truncated sinusoid approach.

In a further embodiment of the invention there is provided a power converter in which the buck PFC stage is operated using a skip-mode PWM controller. By using a skip-mode PWM controller to control the PFC stage, it is possible to get excellent no-load consumption of the power converter and therefore it is possible to keep the input power factor correction stage on at all times. This allows for the stand-by supply to be derived from the bulk capacitor. The stand-by supply efficiency can therefore by optimised as it is fed from a voltage that varies in a relatively narrow region about a DC level typically in the range of 60V to 90V. This allows usage of relatively low voltage FET devices in the stand-by supply circuitry and also contains light-load power loss and optimises active mode efficiency. This further facilitates usage of synchronous rectifiers if their use is appropriate such as when a high current stand-by supply is required.

In one embodiment of the invention there is provided a power converter in which the buck PFC comprises a buck switch and the buck PFC is driven with a signal referenced directly to the voltage at the source terminal of the buck switch.

In another embodiment of the invention there is provided a power converter in which the intermediate buck stage operates using low side current sensing. This is seen as a particularly simple way of controlling the intermediate buck stage.

In a further embodiment of the invention there is provided a power converter in which the intermediate buck stage is operated using a Schottky diode. The Schottky diode will have virtually zero reverse recovery charge, and by using the Schottky diode in the intermediate buck stage, the frequency of the intermediate buck stage may be increased significantly thereby enhancing the efficiency of the intermediate buck stage and hence the overall converter efficiency is improved. This increased efficiency of the intermediate buck stage will have further knock-on benefits for the isolation stage.

In one embodiment of the invention there is provided a power converter in which the intermediate buck stage operates in a down conversion mode of the order of 40%. By having the intermediate buck stage operating in a down conversion mode of the order of 40%, the efficiency of the intermediate bulk converter, which is inversely proportional to the range of input voltage to output voltage, will be greatly enhanced.

In another embodiment of the invention there is provided a power converter in which the overall power converter output is controlled by controlling the duty cycle of the intermediate buck stage. This is seen as particularly efficient way of controlling the overall power converter output. In this way, the isolation stage may operate as an unregulated fixed DC/DC converter. The isolation stage can therefore be easily designed for zero voltage switching and to allow easy deployment of self-driven synchronous rectifier approaches on the converter output rails. A self-driven synchronous rectifier approach preceded by the buck stage is advantageous in the context of management of reverse power flow conditions and under fault conditions.

In a further embodiment of the invention the duty cycle of the intermediate buck stage is controlled using current mode control. Alternatively, the duty cycle of the intermediate buck stage is controlled using voltage mode control.

In one embodiment of the invention there is provided a power converter in which the intermediate buck stage further comprises an intermediate buck switch and the intermediate buck stage is driven with a signal referenced directly to the voltage at the source terminal of the intermediate buck switch.

In another embodiment of the invention there is provided a power converter in which the isolation stage high side is referenced to the high side rail of the power converter.

In a further embodiment of the invention there is provided a power converter in which the isolation stage is operated as a fixed ratio DC/DC voltage transformer. This leads to a particular simple implementation of isolation stage that improves the overall efficiency of the power converter.

In one embodiment of the invention there is provided a power converter in which the isolation stage is arranged for zero-voltage switching.

In another embodiment of the invention there is provided a power converter in which the isolation stage is arranged to allow deployment of self driven synchronous rectifiers on the converter output.

In a further embodiment of the invention there is provided a power converter in which the isolation stage is provided with a balanced winding. By having an isolation stage with a balanced winding, it is feasible in many cases to obviate the need for a shield layer in the transformer. Preferably, the balanced winding is implemented using a full bridge approach.

In one embodiment of the invention there is provided a power converter in which the isolation stage secondary winding is arranged to ensure quiet foil terminations are adjacent to the primary winding. Preferably, a full bridge secondary winding is employed using a redundant centre lap.

In another embodiment of the invention there is provided a power converter in which the isolation stage secondary windings are wound around an internal primary winding and the quiet nodes of the redundant centre tapped secondary winding are located adjacent to the internal primary winding. Preferably, the free terminals of the secondary windings are connected to output rectifier elements. Furthermore, it is envisaged that there may be provided a dummy half turn section connected to the quiet secondary section to minimise noise in the power converter.

In a further embodiment of the invention there is provided a power converter in which the isolation stage is implemented using a cross coupled self driven approach.

In one embodiment of the invention there is provided a power converter in which there is provided a standby supply circuit, the standby supply voltage being taken from the bulk capacitor of the buck PFC stage. In this way, the stand-by supply efficiency can be optimised as it is typically fed from a voltage in the range of 60V to 90V. This allows the use of low voltage field effect transistor (FET) devices and the limited operating range contains light load power loss and optimises active mode efficiency thereby facilitating usage of synchronous rectifiers if their use is appropriate such as when high current stand-by power supplies are desired.

In a further embodiment of the invention there is provided a power converter in which there is provided means to keep the high side rail of the power converter quiet relative to the system earth. Preferably, the means to keep the high side rail of the power converter quiet relative to the system earth comprises placing a differential mode filter on the low side line.

In one embodiment of the invention there is provided a power converter in which there is provided a high side heat sink connected directly to the cathode connection of one or more diodes of the power converter.

In a further embodiment of the invention there is provided a power converter in which the intermediate buck stage is replaced by using an integral cycle control algorithm at the isolation stage.

According to the invention there is provided a power converter comprising a buck pre-regulator and a load, the buck pre-regulator comprising an input, an output, a switch, a buck inductor and a rectifying device, the load being connected to the output of the buck pre-regulator, the power converter further comprising a controller to provide drive to the switch of the buck pre-regulator, characterised in that the switch is configured so that a terminal of the switch is substantially at a common rail shared by the controller. The terminal may be one of a source and an emitter of the switch.

By having such a power converter the controller is able to drive the switch directly with out any complex transformer coupling. This results in a significant reduction in the cost of the control circuitry and the power converter itself. Furthermore, by having such a configuration, it is possible to avoid having to provide a "high side" drive for the main controlled switch which simplifies significantly the control of the power converter.

In one embodiment of the invention there is provided a power converter that further comprises a current sensing circuit provided by way of a resistor connected between the appropriate common rail and the switch. This is seen as a particularly useful configuration for the power converter, as the current sensing function can be implemented easily at a very low cost. The approach is compatible with the mere common architectures for controller integrated circuits. This results in significant benefits to the power converter. A useful alternative to the resistor would be a current transformer which also allows for the current to be sensed in a relatively simple manner. The current transformer will not have the same losses associated therewith as a resistor and will improve efficiency further.

In another embodiment of the invention there is provided a power converter in which the switch is a field effect transistor (FET) and the FET's source is substantially at the common rail.

In a further embodiment of the invention there is provided a power converter in which the switch is a bipolar device and the bipolar device's emitter is substantially at the common rail.

In one embodiment of the invention there is provided a power converter in which the rectifying device is a diode.

In another embodiment of the invention there is provided a power converter in which the rectifying device is a controlled rectifier.

In one embodiment of the invention there is provided a power converter in which the load is an isolation stage of an overall power converter. The load of the device may be referenced to the positive input rail. This is seen as particularly preferred as this configuration of power converter allows the isolation stage to be operated under optimal conditions whereby it will facilitate self driven operation of synchronous rectifiers which is particularly suited to power converters where high efficiency is desired. It is envisaged that the isolation stage may be a voltage-fed stage or indeed may be a current-fed stage.

In another embodiment of the invention there is provided a power converter in which there is provided means to sense the intermediate voltage fed to the output. By having means to sense the intermediate voltage fed to the output, the power converter can materially improve the transient response. This is seen as desirable.

In a further embodiment of the invention there is provided a power converter in which the means to sense the intermediate voltage fed to the output is provided by way of a differential sensing function between the input rail and the output voltage of the pre-regulator stage. In one embodiment, the differential sensing function comprises a PNP transistor. This is a simple configuration of means to sense the intermediate voltage fed to the output.

In one embodiment of the invention there is provided a power converter in which there is further provided a buck power factor correction stage connected to and feeding the input of the buck pre-regulator. It is envisaged that the power converter described may be connected in cascade fashion with a number of stages in the power converter as appropriate. The buck power factor correction stage in cascade connection with the other components of the power converter is seen as a highly useful implementation.

BRIEF DESCRIPTION OF THE DRAWINGS

The invention will now be more clearly understood from the following description of some embodiments thereof given by way of example only with reference to the accompanying drawings in which:—

DETAILED DESCRIPTION OF THE INVENTION

Figure 1:
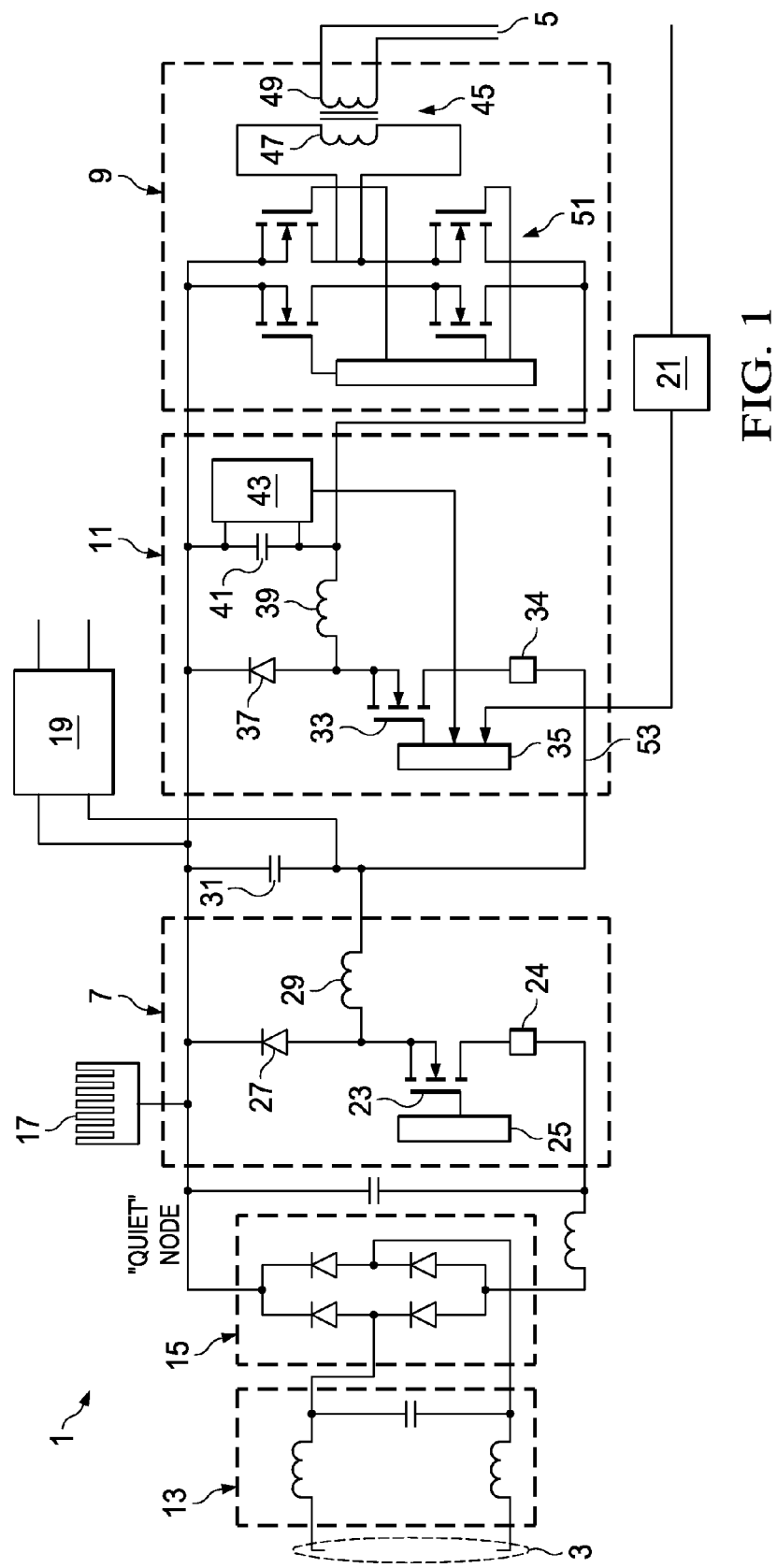
FIG. 1 is a diagrammatic, part schematic representation of a power converter according to the invention.

Referring to the drawings and initially to FIG. 1 thereof there is shown a power converter, indicated generally by the reference numeral 1, comprising a converter input 3, a converter output 5, a power factor correction (PFC) stage 7 provided by way of buck PFC stage, an isolation stage 9 and an intermediate buck pre-regulation stage 11 which follows the buck PFC stage 1. The power converter 1 further comprises an input filtering circuit 13 and an input rectification stage provided by way of a full bridge rectifier 15. The power converter further comprises a heat sink 17, a stand-by circuit 19 and an output sensing unit 21.

The buck PFC stage 7 further comprises a buck switch 23, a buck switch controller 25, a buck diode 27 and a buck inductor 29 which feed a bulk capacitor 31. The intermediate buck pre-regulation stage 11 further comprises a buck switch 33, a buck drive 35, a buck diode 37 and a buck inductor 39 which in turn feed an intermediate bulk capacitor 41. A differential sensing unit 43 is provided to monitor the voltage across intermediate bulk capacitor 41 and provide an output to the buck drive 35. The buck drive 35 further receives an input from the output sensing unit 21. The isolation stage 9 in turn comprises a transformer 45 having a transformer primary 47 and transformer secondary 49. The isolation stage is a double ended unregulated self driven stage 51 with 50%-50% duty cycle. The output of the isolation stage is delivered to output synchronous rectifiers (not shown).

The buck PFC stage 7 is provided with low side drive and low side current sensing and the positive terminal of the bulk capacitor 31 is connected to the high side line coming out of the full bridge rectifier 15. The control algorithm for the buck switch 23 from the buck switch controller 25 is either a clamped current approach or a truncated sinusoid approach. A resistor 24 is connected between the buck switch and the common rail. As an alternative to the resistor, a current transformer may be used. It is envisaged that other control algorithms may be envisaged also. As the bulk capacitor 31 voltage is arranged so that the positive terminal is connected to the high side of the full bridge rectifier 15 with the control circuit referenced conveniently to the low side of the full bridge rectifier output and therefore the bulk capacitor 31 voltage needs to be sensed in a differential fashion. This is required for normal control functions as well as over voltage protection on the capacitor. The intermediate buck pre-regulation stage 11 drive is taken from the low capacitor rail 53, termed $V_{INTERMEDIATE}$. The intermediate buck pre-regulation stage 11 further has low-side current sensing. A resistor 34 is connected between the buck switch 33 and the common rail 53. As an alternative to the resistor, a current transformer may be used. The isolation stage 9 is deployed with the high side referenced to the high side rail of the overall power converter.

The buck diode 37 may be provided by a Schottky diode which will enable the frequency of operation of the intermediate buck pre-regulation stage 11 to be increased. Furthermore, due to the fact that the intermediate buck pre-regulation stage 11 operates at low voltage, in or around the range of 90V or less, the frequency of the intermediate buck pre-regulation stage 11 may also be increased. The efficiency is therefore enhanced by the fact that the input voltage to the intermediate buck pre-regulation stage 11 is quasi-fixed. Typically, the input to the intermediate buck stage is in the range 60V to 90V with a relatively small double line frequency component. The down conversion in magnitude of voltage is typically of the order of 40%, perhaps from 83V to 50V, which corresponds to high efficiency in the stage as the efficiency of the buck stage is inversely proportional to the range of input to output voltage it must handle and a buck converter designed in this context can be very efficient indeed. The range between the nominal bulk capacitor voltage and the level going into the isolation stage is typically chosen to permit sufficient hold-up time and to handle transient conditions on the bulk capacitor. Furthermore, by using a buck stage in this position it is also useful when managing conditions where reverse power flow may occur as this may be a risk particularly when using synchronous rectifiers.

Control of the overall converter output voltage may be achieved by varying the duly cycle of the intermediate buck stage using either voltage mode control or current mode control. In this way, the isolation stage may function approximately as a fixed ratio DC voltage transformer. The isolation stage may be designed for optimum efficiency and can be easily designed for zero voltage switching and to allow easy deployment of self driven synchronous rectifier approaches on the converter output 5. The self driven synchronous rectifier approach preceded by a buck stage is advantageous in the context of management of reverse power flow conditions and under voltage fault conditions.

It is envisaged that the input buck PFC stage may be controlled using skip-mode PWM controllers which provide for excellent no-load consumption characteristics. Furthermore, it is feasible to keep the input PFC stage on at all times and derive the stand-by supply ordinarily required in this type of power converter from the bulk capacitor. The stand-by supply 19 is connected across bulk capacitor 31. The stand-by supply efficiency can therefore be optimised as it will be fed from a voltage supply that varies in a relatively narrow region about a DC level typically in the range of 60V 90V. In this way, usage of 200V FET devices is possible and the limited operating range contains light load power loss and optimises active mode efficiency, facilitating usage of synchronous rectifiers whose usage is appropriate where high current stand-by supplies are desired.

Without loss of generality, it is conceived that a boost or a flyback element may be included between the buck PFC and the bulk capacitor. This can allow for current to be taken across all line angles and can permit the use of a higher bulk capacitor voltage. Therefore, the invention is not necessarily limited to operation in the 60V to 90V range of bulk capacitor voltages.

Figure 2:
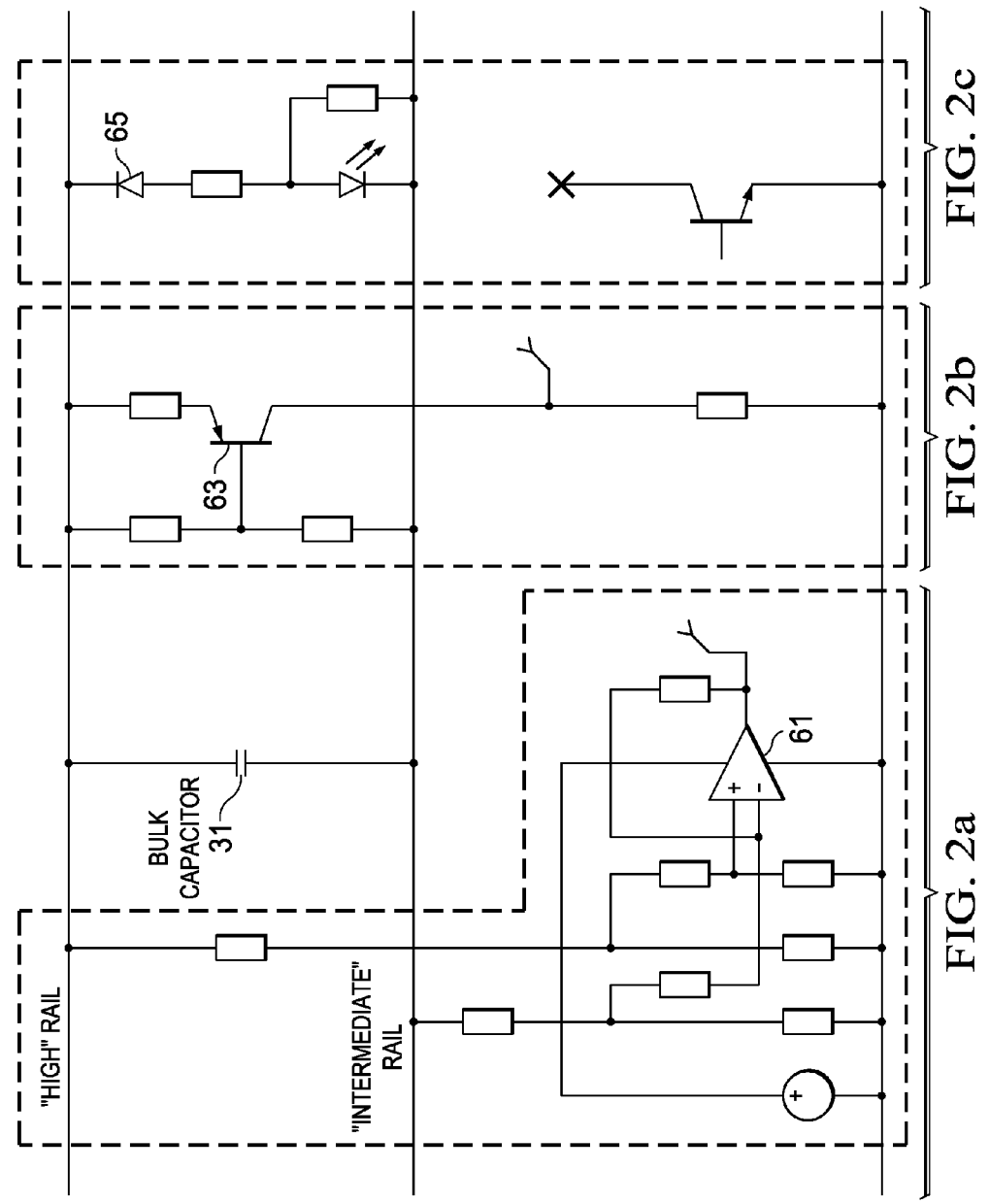
FIGS. 2(a), 2(b) and 2(c) are schematic representations of various differential sensing means used in the power converter according to the invention.

Referring to FIGS. 2(a) to 2(c) inclusive of the drawings there is shown three separate means for differential sensing which may be implemented depending on the cost and resolution required from the power converter. FIG. 2(a) shows a differential amplifier configuration with op-amp 61, FIG. 2(b) shows a PNP transistor 63 which can be configured to provide a low-cost current source whose magnitude is proportional to the capacitor voltage. Finally, in FIG. 2(c) there is shown an optocoupler configuration incorporating a zener diode 65. The type of voltage sensing is either linear, as typically required for loop control, or non-linear, as typically required for detection of overload conditions.

Figure 3:
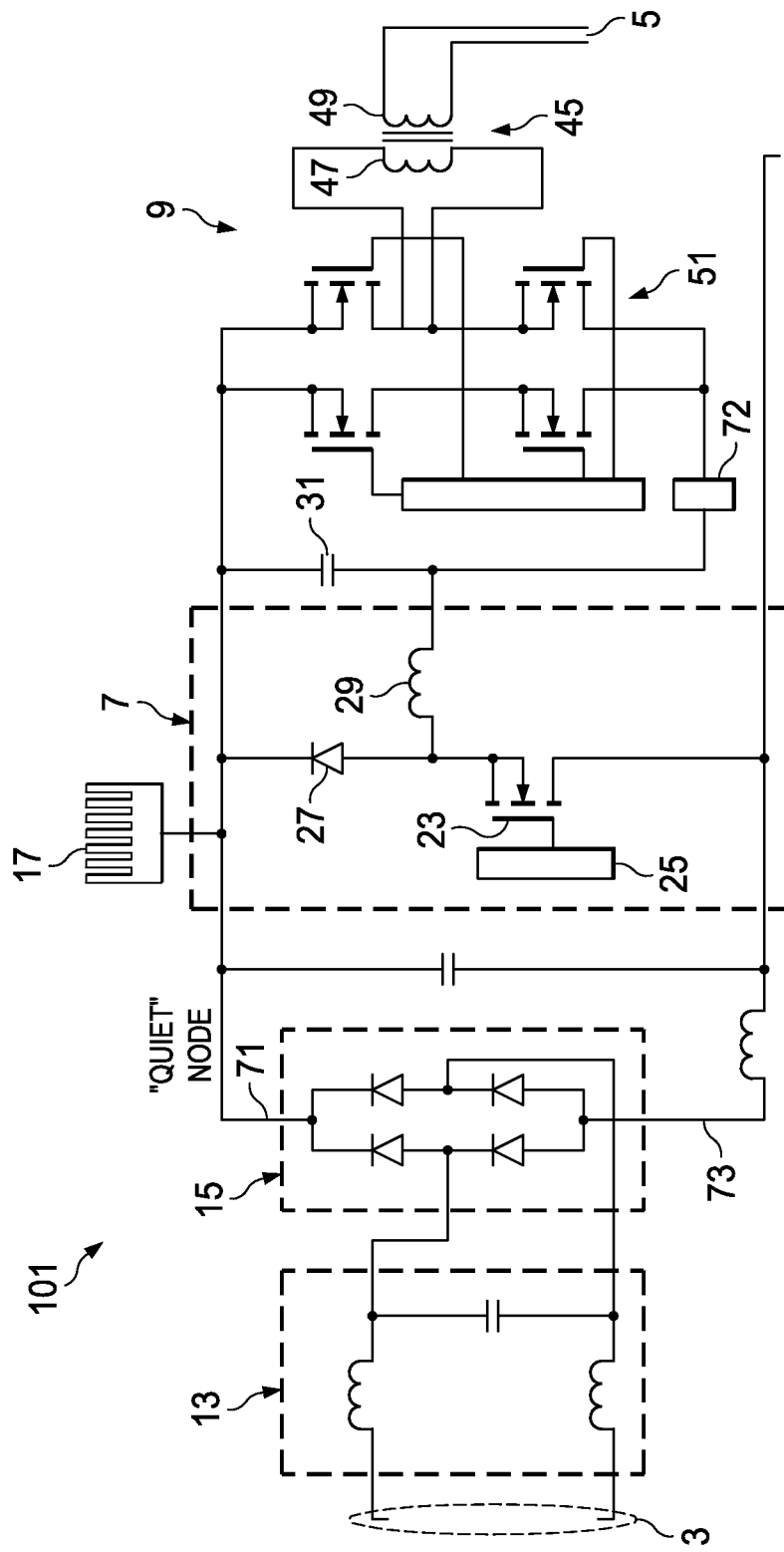
FIG. 3 is a diagrammatic, part schematic representation of an alternative construction of power converter for enhanced electromagnetic compatibility performance.

Referring now to FIG. 3 of the drawings there is shown an alternative configuration of power converter in which the electromagnetic compatibility (EMC) performance of the converter may be enhanced. In this embodiment the intermediate buck stage may be provided or alternatively the isolation stage may be operated using an appropriate integral cycle algorithm instead of the intermediate buck pre-regulation stage. In the embodiment shown, in which parts similar to those described already are identified by the same reference numerals, the high side rail 71 is kept relatively quiet in the context of noise voltages relative to overall system earth. This is achieved by placing differential mode filtering on the low side line 73, the heat sink 17 is directly connected to the tab, otherwise known as the cathode connection, of diodes of the power converter. In this way, the risks associated with washer based connections are obviated. If an isolation stage with a suitably balanced winding, such as a full bridge rectifier approach, is used, this will in most cases obviate the need for a shield layer in the transformer. A current sense device 72 is also provided.

Figure 4:
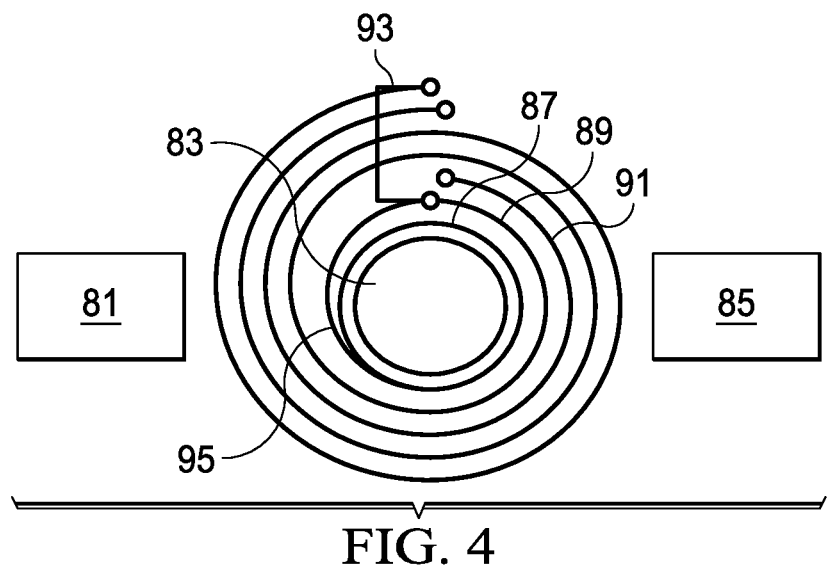
FIG. 4 is a diagrammatic representation of an arrangement of transformer windings for use with the power converter according to the present invention.

Referring to FIG. 4 of the drawings, there is shown a plan view of a particularly suitable construction of transformer for use with a power converter with improved electromagnetic compatibility performance. The transformer comprises core material sections, 81, 83 and 85 and a primary winding 87 wound around core section 83. In this approach, the secondary winding is designed in such a fashion to ensure that the quiet foil terminations are adjacent to the primary winding 87. The secondary winding is a centre tapped full bridge winding with redundant centre tap. Therefore there are a pair of secondary windings 89 and 91. A link 93 may be provided between the pair of secondary windings 89, 91. A dummy half-turn section 95 is provided on the quiet secondary section to minimise noise from this source. By having the tapped full bridge secondary windings with redundant centre tap, it is possible to retain quiet foil in closer proximity to the primary winding. The free terminals of the windings are connected to the appropriate rectifier devices (not shown) and given appropriate output voltages, use of a cross-coupled self-driven approach is feasible.

Furthermore, there are numerous ways of configuring power converters to suit the requirements of the particular application for the power converter. In many instances, it is desirable to design a power converter having an isolation stage that is operated under optimal conditions. These optimal conditions ordinarily correspond to double-ended operation with each switch operating at 50% duty cycle. This mode of operation facilitates self-driven operation of synchronous rectifiers and is particularly suited to power converters where higher efficiency is required. Typically, the voltage available to supply the power converter is variable, and a pre-regulator stage is provided to adjust the input voltage so that the isolation stage can operate under the optimal conditions whilst providing the desired value of output voltage. It has been found that a particularly useful pre-regulator suitable for this application is a so called buck pre-regulator.

Generally speaking, the buck pre-regulator comprises a switch which is controlled to commutate an input supply to a buck inductor. A diode is provided to allow discharge or freewheeling of the buck inductor. The output of the buck stage feeds an isolation stage which typically comprises a half bridge or full bridge stage. Under these circumstances, a transformer coupled gate drive is usually employed. Therefore, a drive is provided to the buck pre-regulator switch and this is commonly referred to as a "high side" drive in which the switching device, which may be a FET or a bi-polar device, has a portion thereof connected directly to a switching node. There are however significant difficulties with the known types of buck pre-regulator circuits. For example, it is relatively complex and/or costly to implement such a "high side" drive scheme for the device. Usually the drive scheme will require either a dedicated high voltage integrated circuit or a transformer which has to be specially designed to operate over a wide range of duty cycle operating conditions. Furthermore, it is also relatively difficult to obtain current sense information in a manner compatible with the requirements of most controller integrated circuits.

Figure 5:
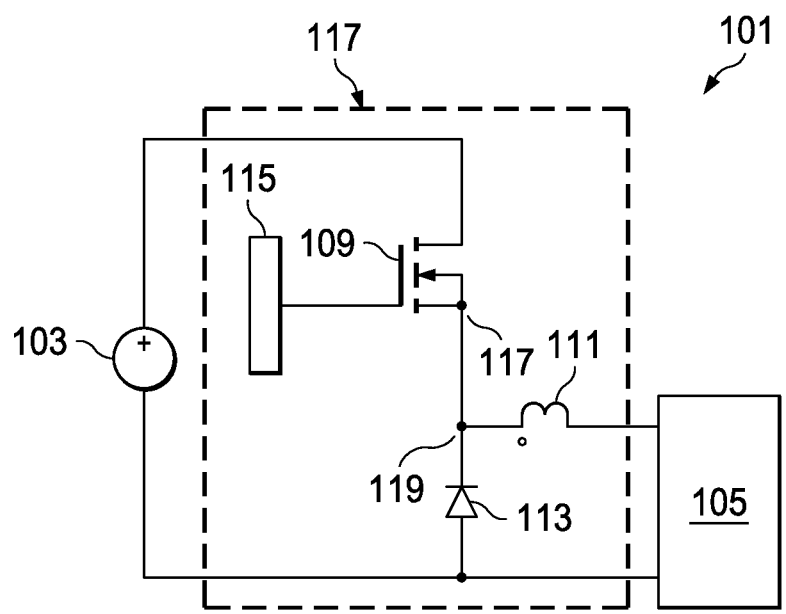
FIG. 5 is a diagrammatic representation of a power converter having a buck pre-regulation stage that is known in the art.

Referring to FIG. 5 there is shown a prior art power converter, indicated generally by the reference numeral 101, comprising a input power supply 103, a load 105 and a buck pre-regulator 107 connected therebetween. The buck pre-regulator 107 further comprises an input, an output, a switch 109, a buck inductor 111 and a rectifying device 113. There is further provided a controller 115 to provide drive to the switch 109. The source 117 of the switch 109 is tied to a switching node 119.

In use, the switch 109 commutates the input supply to the buck inductor 111 and the rectifying device 113 allows for discharge or freewheeling of the buck inductor 111. The output of the buck stage feeds the load 105. Typically this load may be an isolation stage which comprises a half bridge or a full bridge stage and a transformer coupled gate drive (not shown) is usually employed in such cases. The switch is provided with a high side drive. The switch 109 is typically driven also by a variable duty cycle drive. In order to implement a drive scheme for this power converter, it is necessary to provide a dedicated high voltage integrated circuit (not shown) or a transformer (not shown) which has to be specially designed to operate over a wide range of duly cycle operating conditions. This results in a device that requires a drive scheme that is relatively complex and costly to implement. Furthermore, it is extremely difficult to obtain current sense information in a manner compatible with the requirements of most integrated circuits from this Known type of device.

Figure 6:
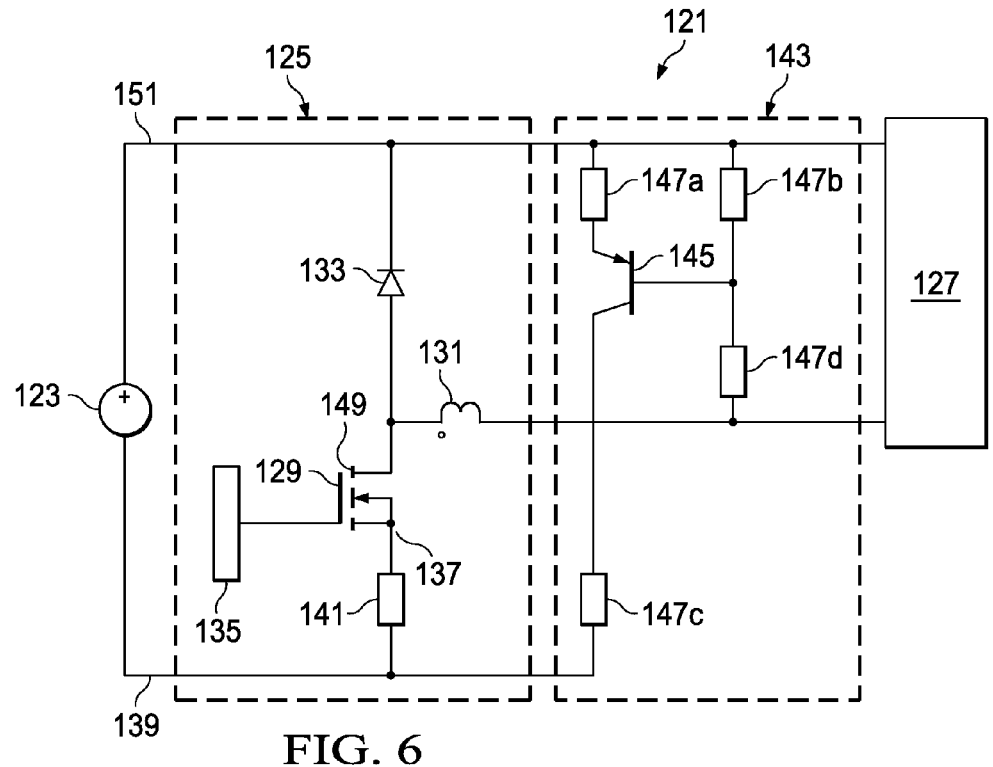
FIG. 6 is a schematic representation of a power converter having a buck pre-regulator according to the present invention.
Figure 7:
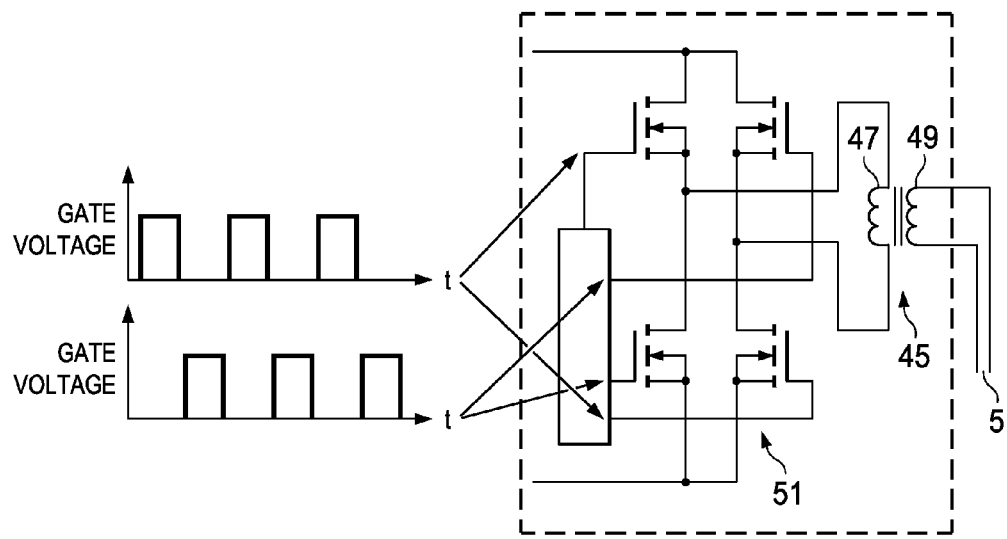
FIG. 7 is a diagrammatic representation of a power converter having a 50percent/50 percent duty cycle.
Figure 8:
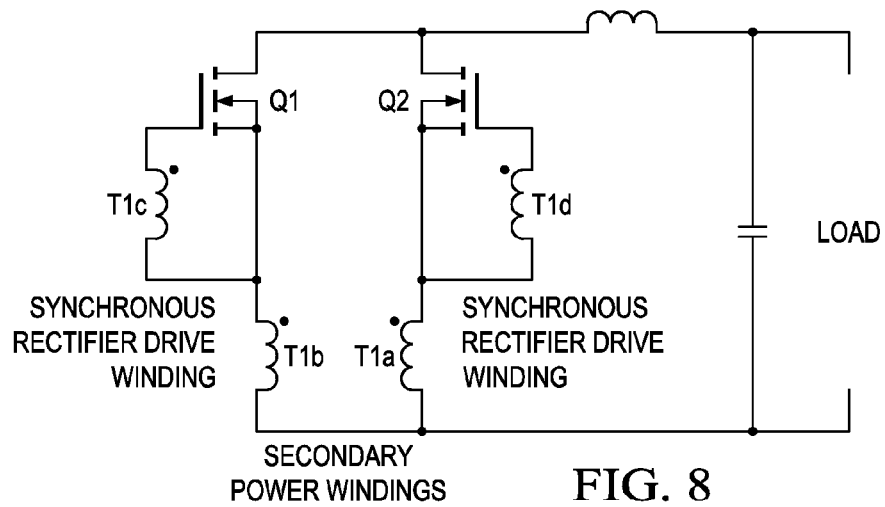
FIG. 8 is a diagrammatic representation of a power converter having self-driven synchronous rectifiers.
Figure 9:
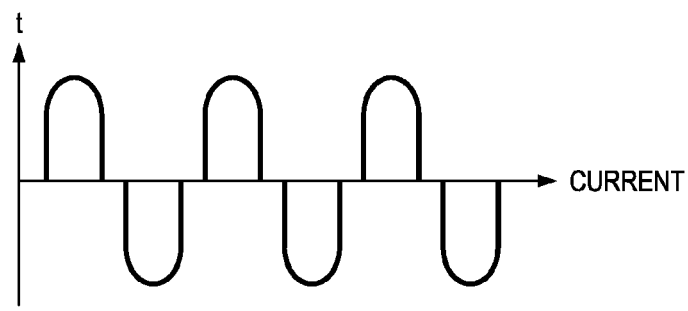
FIG. 9 is an example of a truncated sine wave.
Figure 10:
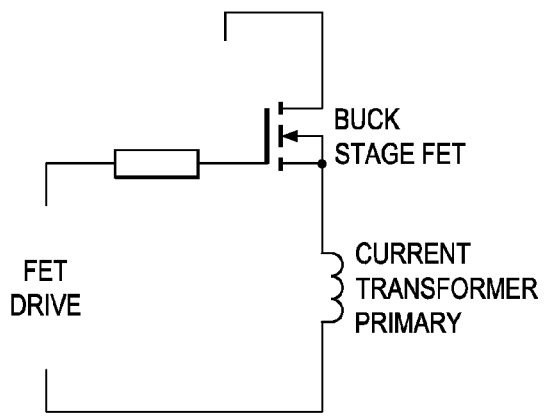
FIG. 10 is a diagrammatic representation of a converter having transformer current sensing.
Figure 11:
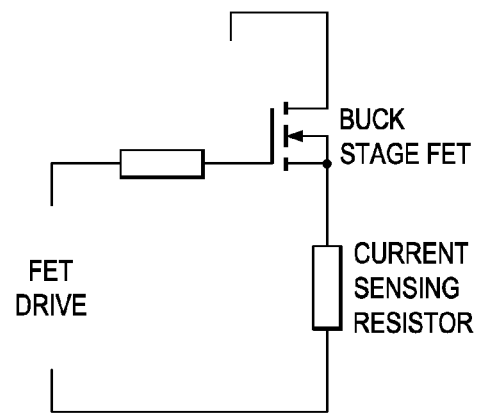
FIG. 11 is a diagrammatic representation of a converter having resistor current sensing.

Referring now to FIG. 6 of the drawings there is shown a pre-regulated power converter according to the present invention, indicated generally by the reference numeral 121. The power converter 121 comprises an input voltage source 123, a buck pre-regulator 125 and a load 127. The buck pre-regulator 125 comprises an input, an output, a switch 129, a buck inductor 131 and a rectifying device provided by way of a diode 133. The load 127 is connected to the output of the pre-regulator. There is further provided a controller 135 to provide drive to the switch 129 of the buck pre-regulator. The switch 129 is configured so that the source 137 of the switch, in this case a FET, is substantially at a common rail 139 shared by the controller 135. The power converter further comprises a current sensing circuit provided by way of a resistor 141 connected between the common rail 139 and the switch 129. In the embodiment shown the load 127 is in fact provided by way of an isolation stage of a power converter. The isolation stage is a voltage fed stage.

The power converter 121 further comprises means to sense the intermediate voltage fed to the output which is provided by way of a differential sensing function, indicated generally by the reference numeral 143 positioned intermediate the input rail and the output voltage of the pre-regulator stage. The differential sensing function 143 comprises a PNP transistor 145 along with a plurality of resistors 147a, 147b, 147c and 147d.

In use, the controller 135 provides the drive for the switch 129 directly without any transformer coupling. The inductor 131 is connected to the drain 149 of the FET switch 129. The load 127 is referenced to the positive input rail 151. Using this circuit, it is possible to sense the current in a simple manner by measuring the voltage developed across the resistor 141.

The load 127, as mentioned previously, is in fact an isolation stage of a power converter. The input stage of the isolation stage is typically a half bridge or a full bridge input stage and it is connected referenced to the positive input rail. All of the switches (not shown) in this stage need to be driven in a manner in which the sources or emitters are all disconnected from the common rail. The provision of transformer coupled drive to such devices is however relatively straight forward as all are operated within a nominal duty cycle of approximately 50%, therefore allowing for simple transformer construction techniques as would be required in the case where the stage was referenced to the common rail.

The differential sensing function 143 is located between the input high rail 151 and the output voltage of the pre-regulator stage 125. This allows intermediate voltage as fed to the isolation stage to be measured which can materially improve the transient response of the power converter. Final regulation may be achieved by overall feedback from the power converter. Essentially therefore, it is possible to carry out relatively crude sensing by differential sensing and thereafter more accurate sensing through the output voltage sensing.

Various modifications could be made to the circuit while remaining within the scope of the spirit of the invention. For example, the power converter may be provided with additional stages arranged in a cascade manner. For example, it is envisaged that a buck power factor correction circuit (not shown) could be provided feeding the input of the buck pre-regulator stage. Furthermore, alternative components could also be arranged in a cascade fashion as would be understood by the skilled addressee. Furthermore, the design described assumes the existence of a positive input rail, but it will be understood that the analysis is equally valid if a negative rail were used with the devices and a controller of suitable polarity was provided. Furthermore, it is envisaged that instead of the FET, a bipolar device could be used with the emitter of the bipolar device connected to the common rail.

In the embodiments shown the output stage has been described as a voltage-fed stage, but this analysis could also apply to the case of a current-fed isolation stage and it is not intended to be limited to the voltage-fed isolation stage. It is envisaged that a higher isolation specification may be required within the drive transformer for the isolation stage but this is usually available at a minimal or no extra cost. This downside is far outweighed by the net benefits of avoiding a high side drive for the main control switch and the simple current sensing method. In the embodiments shown the differential sensing function between the high input rail and the output voltage of the pre-regulator stage which is used to detect the intermediate voltage comprises a simple PNP transistor which allows a required level of accuracy to be provided. In the embodiments shown, the positive rail is used partially because of the inexpensive nature of N channel components. The negative rail could of course be used should the cost of P-channel components decrease in due course. Referencing is carried out on the rail in which the current sensing is not being carried out. Other similar approaches known to the skilled addressee could also be employed as will be understood by the person skilled in the art. Finally, the load in the embodiment described is an isolation stage of a power converter. In certain circumstances, a non-isolated load may be required, in which case direct placement of the load between the buck output and the high side rail may be provided.

It will be recognised that in usage of the buck derived PFC stage, and more generally any circuit in which inrush current limitation is provided, the property of clamping of surge voltages by diodes feeding the bulk capacitor will not be available. To achieve effective clamping it is thus necessary to use either a varistor type element which is significantly oversized. As an alternative to this if is possible to use a smaller varistor in series with a thyristor type clamp device such as the Sidaclor (RTM) range. The above devices would be placed adjacent to the bridge, either on the AC side or the DC side across the input rails. This dual approach ensures a lower clamping voltage which is typically necessary for protection of the elements of the buck type PFC stage. A further varistor may be placed between the high voltage rail and the common rail in order to minimise ringing that may occur due to the differential mode filter choke resonating with the input capacitances.

It will be understood that the buck PFC stage may be operated in burst mode. Furthermore the remaining power train elements may also be operated in burst mode. Some issues associated with burst mode operation have been treated and are handled in the manner described in the applicants own co-pending PCT patent application No. WO 2006/046220, the entire disclosure of which and in particular the content relating to burst mode operation is incorporated herein by way of reference. Finally, it is envisaged that the buck PFC stage with low side drive described above may also be used in isolation with other conventional topologies rather than a three stage approach as outlined above and indeed it is felt that there are numerous benefits of implementing the buck PFC stage described herein with other conventional topologies.

In this specification the terms "comprise, comprises, comprised and comprising" or any variation thereof and the terms "include, includes, included and including" or any variation thereof are considered to be totally interchangeable and they should all be afforded the widest possible interpretation.

The invention is not limited to the embodiments hereinbefore described but may be varied in both construction and detail within the scope of the claims.

The invention claimed is:

1. A power converter comprising:
the converter having an input being connected to a buck power factor correction (PFC) stage, the buck power factor correction (PFC) stage having an output directly connected to an input of a pre-regulation stage comprising an intermediate buck stage, the intermediate buck stage having an output directly connected to an input of an unregulated isolation stage comprising a self-driven synchronous rectifier and an output, the unregulated isolation stage's output is the output of the converter and which is directly connected to a non-regulating load, wherein power flows from the converter input, through the PFC stage, the intermediate buck stage and the unregulated isolation stage to the converter output.

2. A power converter as claimed in claim 1 having a high side voltage rail and a low side voltage rail in which the buck PFC stage is implemented using drive referred to the low side voltage rail.

3. A power converter as claimed in claim 1 having a high side voltage rail and a low side voltage rail in which the intermediate buck stage is implemented using drive referred to the low side voltage rail, with the drive taken from the voltage of the low side of a bulk capacitor, $V_{intermediate}$.

4. A power converter as claimed in claim 1 in which the isolation stage further comprises a 50%-50% duty cycle double ended stage.

5. A power converter as claimed in claim 1 in which the power converter further comprises an input filter stage and an input rectification stage.

6. A power converter as claimed in claim 5 in which the input rectification stage is provided by way of a full bridge rectifier.

7. A power converter as claimed in claim 2 in which the buck PFC stage comprises a bulk capacitor, the bulk capacitor being referenced to the high side rail.

8. A power converter as claimed in claim 7 in which there is provided means to sense the bulk capacitor voltage in a differential fashion.

9. A power converter as claimed in claim 8 in which the means to sense the bulk capacitor voltage in a differential fashion comprises a differential amplifier.

10. A power converter as claimed in claim 8 in which the means to sense the bulk capacitor voltage in a differential fashion comprises a PNP transistor operating as a current source.

11. A power converter as claimed in claim 8 in which the means to sense the bulk capacitor voltage in a differential fashion comprises an optocoupler.

12. A power converter as claimed in claim 8 in which the bulk capacitor voltage is sensed in a linear fashion.

13. A power converter as claimed in claim 8 in which the bulk capacitor voltage is sensed in a non-linear fashion.

14. A power converter as claimed in claim 1 in which the buck PFC comprises a buck switch and the control algorithm used for the buck switch is a clamped current approach.

15. A power converter as claimed in claim 1 in which the buck PFC comprises a buck switch and the control algorithm used for the buck switch is a truncated sinusoid approach.

16. A power converter as claimed in claim 1 in which the buck PFC stage is operated using a skip mode PWM controller.

17. A power converter as claimed in claim 1 in which the buck PFC comprises a buck switch and the buck PFC is driven with a signal referenced directly to the voltage at the source terminal of the buck switch.

18. A power converter as claimed in claim 3 in which the intermediate buck stage operates using low side current sensing.

19. A power converter as claimed in claim 1 in which the intermediate buck stage is operated using a Schottky diode.

20. A power converter as claimed in claim 1 in which the intermediate buck stage operates in a down conversion mode of the order of 40%.

21. A power converter as claimed in claim 1 in which the overall power converter output is controlled by controlling the duty cycle of the intermediate buck stage.

22. A power converter as claimed in claim 21 in which the duty cycle of the intermediate buck stage is controlled using current mode control.

23. A power converter as claimed in claim 21 in which the duty cycle of the intermediate buck stage is controlled using voltage mode control.

24. A power converter as claimed in claim 1 in which the intermediate buck stage further comprises an intermediate buck switch and the intermediate buck stage is driven with a signal referenced directly to the voltage at the source terminal of the intermediate buck switch.

25. A power converter as claimed in claim 1 in which the isolation stage high side is referenced to the high side rail of the power converter.

26. A power converter as claimed in claim 1 in which the isolation stage is operated as a fixed ratio DCDC voltage transformer.

27. A power converter as claimed in claim 1 in which the isolation stage is arranged for zero-voltage switching.

28. A power converter as claimed in claim 1 any preceding claim in which the isolation stage is provided with a balanced winding.

29. A power converter as claimed in claim 28 in which the balanced winding is implemented using a full bridge approach.

30. A power converter as claimed in claim 1 in which the isolation stage is implemented using a cross coupled self driven approach.

31. A power converter as claimed in claim 1 in which there is provided a standby supply circuit, the standby supply voltage being taken from a bulk capacitor of the buck PFC stage.

32. A power converter as claimed in claim 25 in which there is provided a high side heat sink connected directly to the cathode connection of one or more diodes of the power converter.

33. A power converter as claimed in claim 1 in which there is provided one of a resistor and a current transformer between a power rail and the buck PFC stage switch.

34. A power converter as claimed in claim 1 in which there is provided one of a resistor and a current transformer between a power rail and the intermediate buck switch.

35. A power converter as claimed in claim 1 in which there is provided a clamping circuit mounted across input rails.

36. A power converter as claimed in claim 35 in which the clamping circuit comprises a varistor type element.

37. A power converter as claimed in claim 36 in which there is further provided a thyristor type clamp device in series with the varistor.

38. A power converter as claimed in claim 35 in which there is provided a further varistor placed between a high voltage rail and the common rail.

39. A power converter as claimed in claim 1 in which the buck PFC stage is operated in burst mode.

40. A power converter as claimed in claim 1 in which the converter is operated in burst mode.

* * * * *